United States Patent
Kim et al.

(10) Patent No.: US 9,074,570 B2
(45) Date of Patent: Jul. 7, 2015

(54) METHOD AND SYSTEM FOR CONTROLLING OUTPUT OF HYBRID STARTER GENERATOR

(71) Applicant: Hyundai Motor Company, Seoul (KR)

(72) Inventors: Hyun Kim, Gyeonggi-do (KR); Kyung Ha Kim, Gyeonggi-do (KR); Jae Hyuk Suh, Gyeonggi-do (KR); Seung Woo Ha, Gyeonggi-do (KR); Yeon Ho Kim, Gyeonggi-do (KR); Sam Gyun Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 400 days.

(21) Appl. No.: 13/688,150

(22) Filed: Nov. 28, 2012

(65) Prior Publication Data

US 2014/0052364 A1 Feb. 20, 2014

(30) Foreign Application Priority Data

Aug. 17, 2012 (KR) .................. 10-2012-0090066

(51) Int. Cl.
| | |
|---|---|
| F02N 11/04 | (2006.01) |
| F02N 11/08 | (2006.01) |
| B60K 6/442 | (2007.10) |
| B60W 10/08 | (2006.01) |
| B60W 20/00 | (2006.01) |
| F02N 15/08 | (2006.01) |

(52) U.S. Cl.
CPC .............. *F02N 11/0803* (2013.01); *F02N 11/04* (2013.01); *F02N 11/0866* (2013.01); *F02N 15/08* (2013.01); *F02N 2011/0888* (2013.01); *F02N 2011/0896* (2013.01); *B60K 6/442* (2013.01); *B60W 10/08* (2013.01); *B60W 2710/083* (2013.01); *B60W 2710/088* (2013.01); *B60W 20/10* (2013.01); *Y02T 10/6234* (2013.01)

(58) Field of Classification Search
CPC .......................... F02N 11/0803; F02N 11/04
USPC ................. 123/179.3, 179.28; 701/110, 113; 290/27, 36 R, 38 R; 180/65.1, 65.21
See application file for complete search history.

(56) References Cited

U.S. PATENT DOCUMENTS

| | | | |
|---|---|---|---|
| 8,886,374 B2 * | 11/2014 | Kim ............................... 701/22 |
| 2013/0325268 A1 * | 12/2013 | Ishihara et al. ................. 701/50 |
| 2014/0365055 A1 * | 12/2014 | Fujiyoshi et al. .............. 701/22 |

FOREIGN PATENT DOCUMENTS

| | | |
|---|---|---|
| JP | 09-222064 | 8/1997 |
| JP | 11-103504 A | 4/1999 |

(Continued)

*Primary Examiner* — Hai Huynh
(74) *Attorney, Agent, or Firm* — Mintz Levin Cohn Ferris Glovsky and Popeo, P.C.; Peter F. Corless

(57) ABSTRACT

Disclosed herein is a method and a system for controlling a generation output of a starter generator connected to an engine to transmit a rotary force in a hybrid electric vehicle. The method includes receiving, by a controller, vehicle state information for determining a driving mode of the vehicle after the vehicle starts, and determines the driving mode requiring an increase of the generation output from the vehicle state information; determining, by the controller, a need for the increase of the generation output to control a generation output variable for each driving mode; determining, by the controller, a torque command and a torque application time corresponding to a required output for each driving mode of the vehicle to control the generation output variable; and applying, by the controller, the determined torque command for the determined application time to control the generation output of the starter generator.

12 Claims, 4 Drawing Sheets

(56) References Cited

FOREIGN PATENT DOCUMENTS

| JP | 2003-009307 A | 1/2003 |
| JP | 2006-050859 A | 2/2006 |
| JP | 2007-189788 A | 7/2007 |
| JP | 2011-235802 A | 11/2011 |

* cited by examiner

| RPM [RPM] | GENERATION OUTPUT [KW_DC] | TORQUE COMMAND [Nm] | APPLICATION TIME [MIN] | RESTRICTIVE CONDITION |
|---|---|---|---|---|
| 1300 [VARIABLE ACCORDING TO ENGINE] | 4 | 11.5 | 120MIN | COIL TEMPERATURE ≤ 150 DEGREES or TEMPERATURE RISE ≤ 45 DEGREES |
| | 5 | 14.5 | 120MIN | |
| | 6 | 17.5 | 60MIN | |
| | 7 | 20.5 | 60MIN | |
| | 8 | 23.5 | 20MIN | |

FIG. 4

METHOD AND SYSTEM FOR CONTROLLING OUTPUT OF HYBRID STARTER GENERATOR

CROSS-REFERENCE

This application claims under 35 U.S.C. §119(a) the benefit of Korean Patent Application No. 10-2012-0090066 filed Aug. 17, 2012, the entire contents of which are incorporated herein by reference.

BACKGROUND OF THE INVENTION (a) Field of the Invention

The present invention relates to a method and a system for controlling an output of a starter generator in a hybrid electric vehicle. More particularly, the present invention relates to a method and a system for controlling an output of a starter generator, which may improve noise, vibration, and harshness (NVH) performance, prevent additional cost for the improvement of the NVH performance, and reduce the size and weight of the hybrid starter generator (HSG).

(b) Description of Related Art

Hybrid vehicles use two kinds of power sources efficiently combined to drive a vehicle. Many hybrid vehicles may be driven by an engine utilizing a rotary force by burning fuel (fossil fuel such as gasoline and diesel) and an electric motor utilizing a rotary force by a battery power, which are typically called hybrid electric vehicles (HEV).

The hybrid vehicles may be considered future vehicles that may facilitate the improvement of the fuel efficiency and the reduction of exhaust gases by utilizing the electric motor as an auxiliary power source in addition to the engine. Many studies are currently being conducted to meet the current demands for improving fuel efficiency and developing environmentally friendly products.

The hybrid vehicles may be driven by an electric vehicle (EV) mode that is a pure electric vehicle mode in which only the power of the electric motor (drive motor) is used. Alternatively, hybrid vehicles may be driven by a hybrid electric vehicle (HEV) mode in which the rotary force of the drive motor is used as an auxiliary power while the rotary force of the engine is used as a main power. Additionally, a regenerative braking (RB) mode may be used in which the braking and inertial energy during driving of a vehicle may be collected and charged in a battery through generation of the drive motor.

Thus, the mechanical energy of the engine and the electrical energy of the battery are used together, and the optimal operation range of the engine and the drive motor may be used. In addition, energy may be collected in the drive motor upon braking. Accordingly, an improvement of the fuel efficiency of a vehicle and energy efficiency may be possible.

FIG. 1 is an exemplary view illustrating a configuration of a hybrid system, according to an exemplary embodiment of the present invention. As shown in FIG. 1, the hybrid system for driving a hybrid vehicle may have a layout in which an engine 10, a drive motor 20, and a transmission 30 are arranged adjacent to one another. Furthermore, the engine 10 and the drive motor 20 are connected to transmit power via an engine clutch 50. Additionally, the drive motor 20 and the transmission 30 are directly connected.

Moreover, a hybrid starter generator 40 that may provide a rotary force to the engine 10 (e.g., outputs a cranking torque) upon start-up is connected to the engine 10. In this configuration, when the engine clutch 50 is engaged, a drive shaft of the vehicle may be driven by the drive motor 20. When the engine clutch 50 is disengaged, the drive shaft of the vehicle may be driven by the engine 10 and the drive motor 20.

Additionally, a hybrid power control unit (HPCU) 61 and a low voltage DC/DC converter (LDC) 63 are provided as electric power components. The HPCU 61, which is an integrated control unit, may perform various functions such as selecting the engine 10 or the drive motor 20 as the power for driving the vehicle; determining the power distribution ratio according to the driving condition of a vehicle; converting a voltage of a high voltage battery (HV BATT) 62 into a voltage for the driving of the drive motor; and an MCU (including an inverter) function of controlling the drive motor 20. The LDC 63 may lower a high voltage of the HV BATT 62 to a low voltage to supply the low voltage to the electric components of a vehicle via a low voltage battery (12V BATT) 64. In addition, an electric oil pump 65 is provided.

FIG. 2 is an exemplary view illustrating an exemplary HSG of a hybrid system, according to an exemplary embodiment of the present invention.

A HSG 40 is a core component of a hybrid vehicle for engine start-up and continuous power generation function. The power generation function for charging the high voltage battery 62 may require a wide range of output (e.g., from DC 2 to 8 kW) according to the driving mode of a vehicle. However, to configure the HSG 40 to meet the maximum generation output, a water cooling structure for cooling upon heating may be enlarged. In addition, since the heat-resistance grade of a coil increases, the material cost may excessively increase. Accordingly, recently developed HSGs are configured with devices that may not produce the maximum generation output required for vehicle mode. If necessary, the engine idle rpm may be variably controlled (e.g., 1,300 idle rpm and DC 5 kW are changed into 1,700 idle rpm and DC 8 kW) to compensate for a deficient generation output. However, the variable control of the idle rpm may cause interior noise and vibration due to the increase of the idle rpm, and thus additional noise-proof and vibration-proof measures may be needed.

In the variable control of the idle rpm, the charging capacity of the battery of the HSG may increase due to the increase of the engine idle rpm, whereas the peripheral components (engine) may vibrate during idle speed, deteriorating the NVH performance. To prevent deterioration of the NVH performance, the reinforcement of the housing stiffness of HSG and the rotor skew may be implemented, however this method may increase the manufacturing cost, the size and the weight of the HSG.

The above information disclosed in this section is only for enhancement of understanding of the background of the invention and therefore it may contain information that does not form the prior art that is already known to a person of ordinary skill in the art.

SUMMARY OF THE INVENTION

The present invention provides a method and a system for controlling an output of a starter generator, which may improve noise, vibration, and harshness (NVH) performance, prevent additional cost for the improvement of the NVH performance, and reduce the size and weight of the HSG.

In one embodiment, the present invention provides a method for controlling a generation output of a starter generator connected to an engine to transmit a rotary force in a hybrid electric vehicle, the method including: receiving, by a controller, vehicle state information for determining a driving mode of the vehicle after the vehicle starts and determining the driving mode requiring an increase of the generation output from the vehicle state information; determining, by the controller, from the driving mode a need for the increase of the generation output to control the generation output variable for each driving mode; determining, by the controller, a torque command and a torque application time corresponding to a required output for each driving mode of the vehicle to perform the generation output variable control; and controlling the generation output of the starter generator by applying the determined torque command for the determined application time.

In an exemplary embodiment, determining the torque command and the torque application time may include using a control map in which the torque command and the torque application time are defined as preset values according to the required output.

In another exemplary embodiment, controlling the generation output of the starter generator may further include: monitoring, by the controller, a coil temperature of the starter generator; and terminating the generation output variable control of the starter generator for each driving mode when the coil temperature of the starter generator is equal to or greater than a predetermined reference temperature.

In still another exemplary embodiment, when the coil temperature of the starter generator is equal to or greater than the reference temperature for a predetermined time or more, the generation output variable control of the starter generator for each driving mode may be set to be terminated.

BRIEF DESCRIPTION OF THE DRAWINGS

The above and other features, objects and advantages of the present invention will now be more clearly understood from the following detailed description taken in conjunction with the accompanying drawings, in which:

FIG. 4 is an exemplary view illustrating a control map according to an exemplary embodiment of the present invention.

Figure 1:
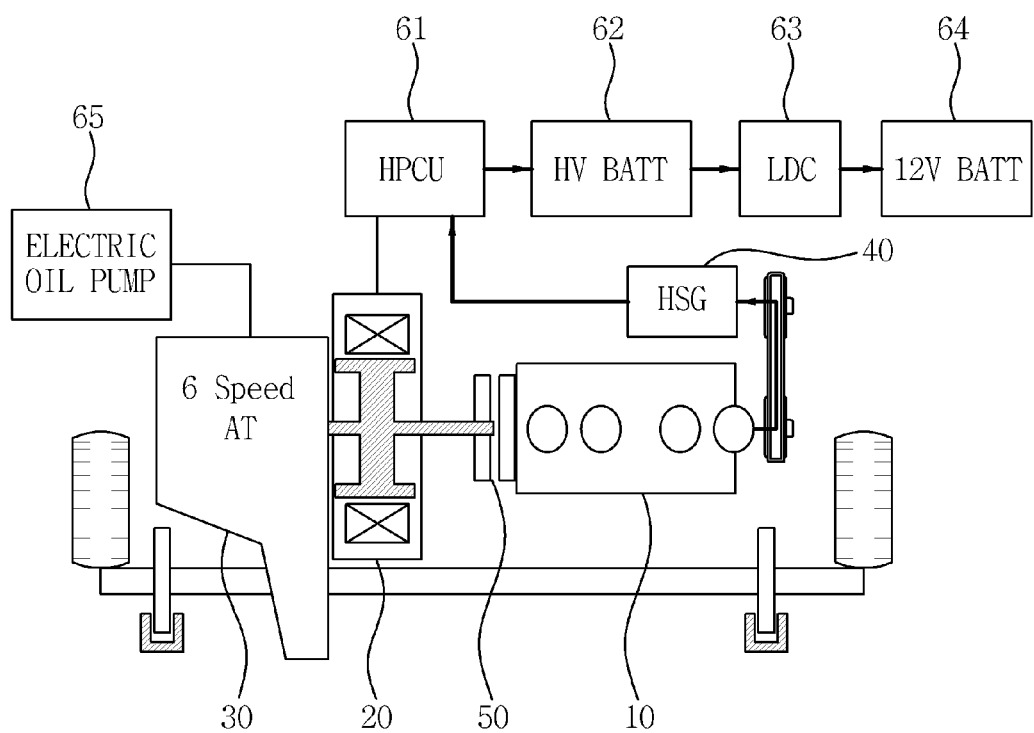
FIG. 1 is an exemplary view illustrating a configuration of a hybrid system, according to the related art.
Figure 2:
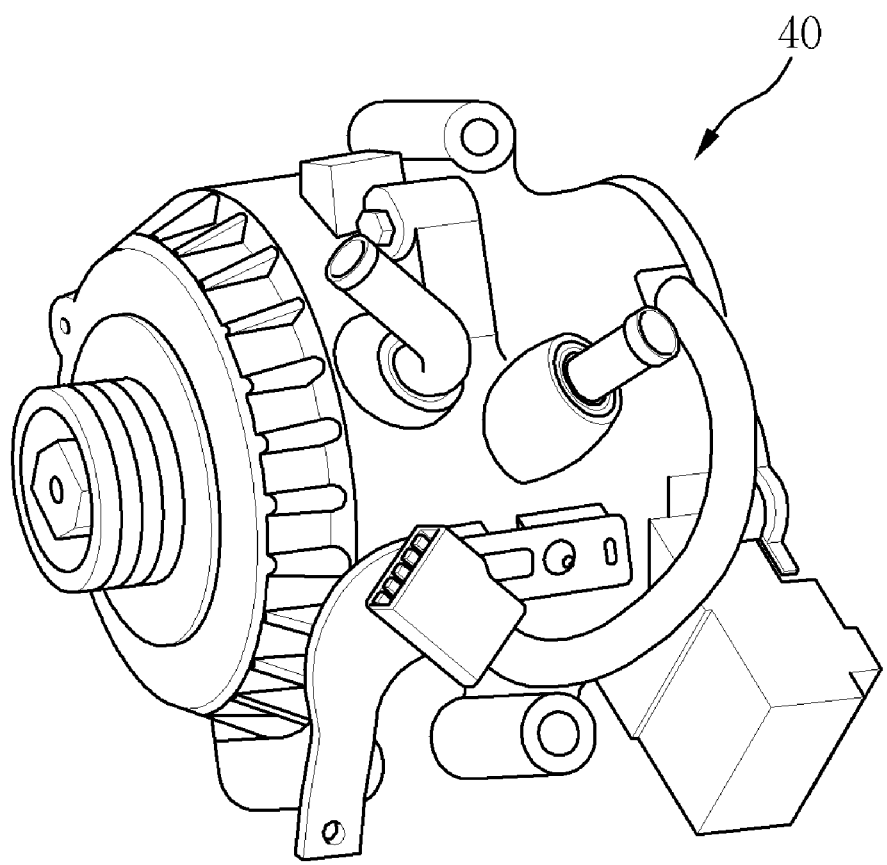
FIG. 2 is an exemplary view illustrating an exemplary HSG of a hybrid system, according to the related art.

Reference numerals set forth in the Drawings includes reference to the following elements as further discussed below:

| 10: engine | 20: drive motor |
| --- | --- |
| 30: transmission | 40: hybrid starter generator (HSG) |
| 50: engine clutch | 61: hybrid power control unit (HPCU) |

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, the control logic of the present invention may be embodied as non-transitory computer readable media on a computer readable medium containing executable program instructions executed by a controller including a processor and a memory. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Hereinafter, exemplary embodiments of the present invention will be described in detail with reference to the accompanying drawings so that those skilled in the art may easily carry out the present invention.

The present invention relates to a method and a system for variably controlling a continuous output of a starter generator, which may improve noise, vibration, and harshness (NVH) performance, prevent additional cost for the improvement of the NVH performance, and reduce the size and weight of the hybrid starter generator (HSG).

The method for variably controlling the continuous output of the starter may include an engine idle rpm set to a tolerable level (e.g., about 1,300 idle rpm) of the interior noise in a hybrid vehicle, and the generation output of a hybrid starter generator (HSG) may be variably controlled according to the driving mode of the vehicle and the coil temperature.

The method for controlling the output of the hybrid starter generator (hereinafter, referred to as HSG) may include the steps of determining, by a controller, the output of the HSG required according to the driving mode (e.g., low speed long climbing mode, stop mode, and cold transition period mode) of a vehicle and controlling the output of the HSG to a required output for each driving mode for a predetermined time by referring to a control map according to the coil temperature of the HSG.

Hereinafter, the method for controlling the output of the HSG will be described in more detail with reference to FIG. 3.

Controller described below may be a super-controller that may control the power generation output of the HSG in communication with sub-controllers. The controller may be an HPCU or a hybrid control unit (HCU), but the embodiments are not limited thereto.

Figure 3:
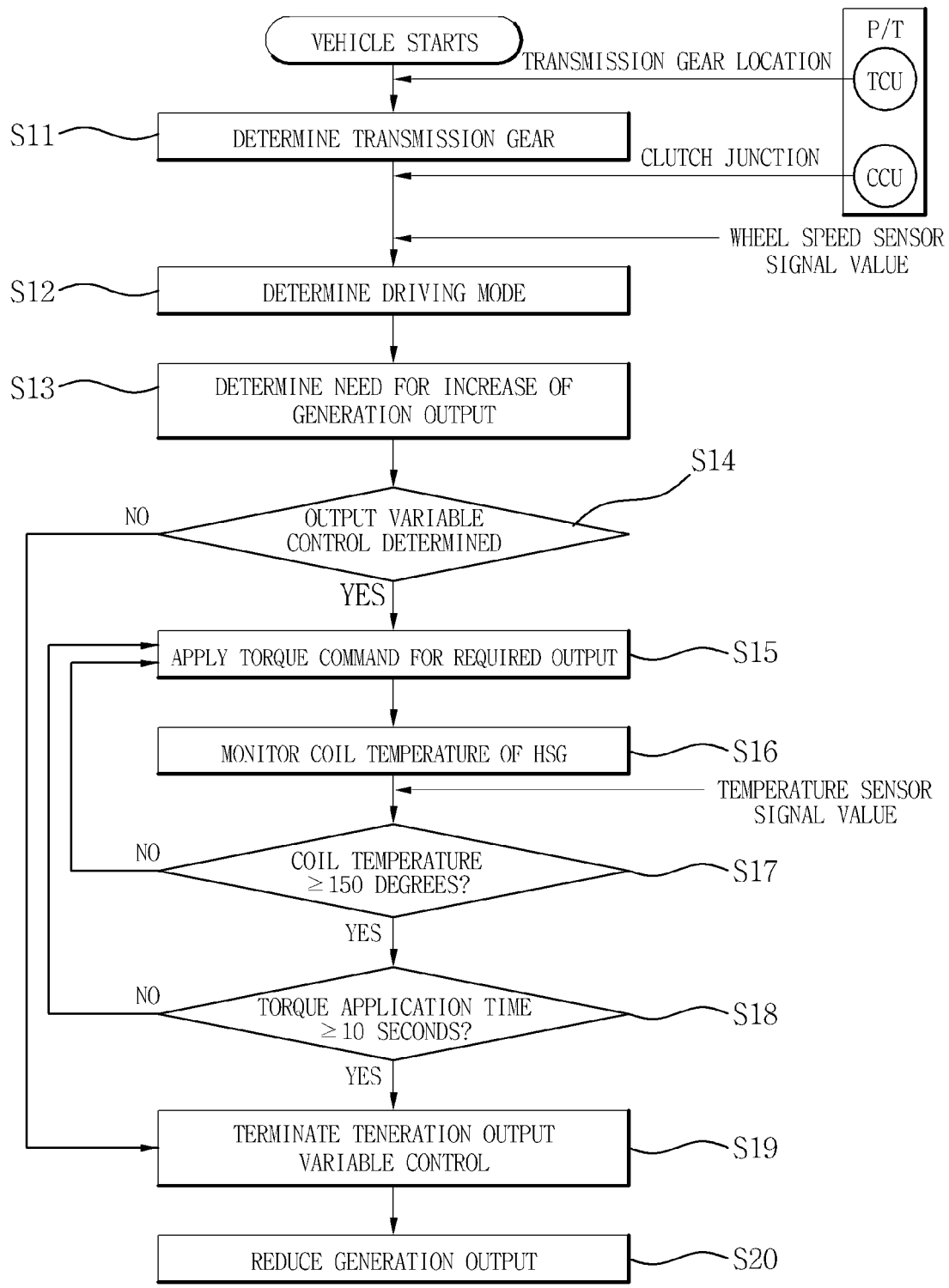
FIG. 3 is an exemplary flowchart illustrating a generation output control process of a starter generator according to an exemplary embodiment of the present invention.

FIG. 3 is an exemplary flowchart illustrating a generation output control process of a starter generator according to an exemplary embodiment of the present invention. After a vehicle starts, the controller may receive the vehicle state information for determining the driving mode of the vehicle from the sub-controller.

The controller may receive information on current transmission gear location and current clutch operation state (particularly, clutch junction state) from a transmission control unit (TCU) and a clutch control unit (CCU), sub-controllers executed by the controller. Additionally, the controller may receive a signal of a wheel speed sensor and a signal of a motor speed sensor, and may determine the driving mode of a vehicle based on information such as transmission gear location, clutch operation state, wheel speed, and motor speed (S11 and S12). Furthermore, when a vehicle is in a low speed long climbing mode, a stop mode, and a cold transition period mode in which the generation output needs to increase, the controller may control the generation output variable of the HSG to increase the generation output (S13 and S14).

The controller, as shown in FIG. 4, may variably control the generation output of the HSG into an output required for each driving mode of a vehicle when the generation output variable control of the HSG is determined, in a state where the engine idle speed is fixed (e.g., the idle rpm is fixed to about 1,300 rpm). In particular, the controller may determine a torque command and a torque application time corresponding to each driving mode from the control map. Thereafter, the output of the HSG may be controlled, by the controller, to perform a required level of generation output by applying the torque command for the application time obtained from the control map (S15).

Simultaneously, the controller may monitor the coil temperature of the HSG via a temperature sensor disposed in the HSG during the generation output control (S16). When the coil temperature is equal to or greater than a predetermined reference temperature for a predetermined time or more, the generation output variable control of the HSG may be terminated, and the generation output may be reduced (S17 to S20). Alternatively, when the coil temperature of the HSG is smaller than the reference temperature or equal to or greater than the reference temperature for a time shorter than the predetermined time, the torque command according to the required output for the application time obtained from the control map may be continuously applied to control the generation output of the HSG.

In this embodiment, the control map may include data that is set and stored in a memory for calculating the torque command and the application time using an input of the required output from the corresponding vehicle. The control map may include data in which the torque command and the application time according to the required output for each driving mode are predefined using test data (e.g., electricity output data of HSG according to the engine rpm) obtained from previous tests (e.g., generation output principle tests) that are performed under the same conditions.

In this embodiment, the controller may determine the generation output variable control condition, and may determine the torque command and the torque application time according to the required output for each mode by referring to the control map while controlling the generation output of the HSG. Thereafter, the controller may perform the generation output control process for applying the torque command for the application time, thereby producing an output by HSG. However, when the coil temperature is equal to or greater than the reference temperature for a predetermined time or more, the generation output control performed based on the control map may be stopped to reduce the generation output.

Thus, since the engine idle speed may be fixed to an rpm at which the interior noise and vibration are tolerable, and simultaneously, the generation output variable control of the HSG may be performed according to a required output in consideration of the coil temperature of the driving mode and the HSG of a vehicle, the NVH performance may be improved, and the cost, the size and the weight for the HSG may be reduced.

The invention has been described in detail with reference to exemplary embodiments thereof. However, it will be appreciated by those skilled in the art that changes, modifications and variations may be made in these embodiments without departing from the principles and spirit of the invention, the scope of which is defined in the accompanying claims and their equivalents.

What is claimed is:

1. A method for controlling a generation output of a starter generator connected to an engine to transmit a rotary force in a hybrid electric vehicle, the method comprising:
   receiving, by a controller, vehicle state information for determining a driving mode of the vehicle after the vehicle starts;
   determining, by the controller, that the driving mode requires an increase of the generation output from the vehicle state information;
   determining, by the controller, from the driving mode the required increase of the generation output to control a generation output variable for each driving mode;
   determining, by the controller, a torque command and a torque application time corresponding to the generation output variable for each driving mode of the vehicle; and
   applying, by the controller, the determined torque command for the determined torque application time, to control the generation output of the starter generator.

2. The method of claim 1, wherein the determining, by the controller, of the torque command and the torque application time further comprises using a control map, wherein the torque command and the torque application time are preset values according to the required output.

3. The method of claim 1, wherein the controlling of the generation output, by the controller, of the starter generator further comprises:

monitoring, by the controller, a coil temperature of the starter generator; and terminating, by the controller, the generation output variable control of the starter generator for each driving mode when the coil temperature of the starter generator is equal to or greater than a predetermined reference temperature.

4. The method of claim 3, wherein when the coil temperature of the starter generator is equal to or greater than the predetermined reference temperature for a predetermined time or more, the generation output variable control of the starter generator for each driving mode is terminated.

5. A system for controlling a generation output of a starter generator connected to an engine to transmit a rotary force in a hybrid electric vehicle, the system comprising:

a controller configured to:
  receive vehicle state information for determining a driving mode of the vehicle after the vehicle starts;
  determine that the driving mode requires an increase of the generation output from the vehicle state information;
  determine from the driving mode the required increase of the generation output to control a generation output variable for each driving mode;
  determine a torque command and a torque application time corresponding to the generation output variable for each driving mode of the vehicle; and
  apply the determined torque command for the determined torque application time.

6. The system of claim 5, wherein the controller is further configured to determine the torque command and the torque application time using a control map, wherein the torque command and the torque application time are preset values according to the required output.

7. The system of claim 5, wherein the controller is further configured to:
  monitor a coil temperature of the starter generator; and
  terminate the generation output variable control of the starter generator for each driving mode when the coil temperature of the starter generator is equal to or greater than a predetermined reference temperature.

8. The system of claim 7, wherein the controller is further configured to terminate the generation output variable control of the starter generator for each driving mode when the coil temperature of the starter generator is equal to or greater than the predetermined reference temperature for a predetermined time or more.

9. A non-transitory computer medium, containing program instructions executed by a processor on a controller, the computer readable medium comprising:
  program instructions that receive vehicle state information for determining a driving mode of the vehicle after the vehicle starts;
  program instructions that determine that the driving mode requires an increase of the generation output from the vehicle state information;
  program instructions that determine from the driving mode the required increase of the generation output to control a generation output variable for each driving mode;
  program instructions that determine a torque command and a torque application time corresponding to the generation output variable for each driving mode of the vehicle; and
  program instructions that apply the determined torque command for the determined torque application time, to control the generation output of the starter generator.

10. The non-transitory computer readable medium of claim 9, wherein the program instructions that determine the torque command and the torque application time further comprise using a control map, wherein the torque command and the torque application time are preset values according to the required output.

11. The non-transitory computer readable medium of claim 9, further comprising:
  program instructions that monitor a coil temperature of the starter generator; and
  program instructions that terminate the generation output variable control of the starter generator for each driving mode when the coil temperature of the starter generator is equal to or greater than a predetermined reference temperature.

12. The non-transitory computer readable medium of claim 11, further comprising:
  program instructions that terminate the generation output variable control of the starter generator when the coil temperature of the starter generator is equal to or greater than the predetermined reference temperature for a predetermined time or more.

* * * * *